United States Patent [19]

Romero

[11] Patent Number: 4,936,591
[45] Date of Patent: Jun. 26, 1990

[54] LOW FRICTION RADIAL LIP SEAL WITH DEFORMABLE SEAL CASING

[75] Inventor: Richard A. Romero, Farmington Hills, Mich.

[73] Assignee: Federal-Mogul Corporation, Southfield, Mich.

[21] Appl. No.: 416,631

[22] Filed: Oct. 3, 1989

[51] Int. Cl.$^5$ .............................................. F16J 15/34
[52] U.S. Cl. .......................................... 277/1; 277/37; 277/153
[58] Field of Search ................. 277/1, 37, 153, 9, 9.5, 277/95, 35, 38, 39

[56] References Cited

U.S. PATENT DOCUMENTS

| | | | |
|---|---|---|---|
| 3,135,518 | 6/1964 | Carson et al. | 277/37 |
| 3,510,138 | 5/1970 | Bowen et al. | 277/35 |
| 4,049,281 | 9/1977 | Bainard | 277/1 |
| 4,448,426 | 5/1984 | Jackowski et al. | 277/37 |
| 4,552,367 | 11/1985 | Fedorovich et al. | 277/1 |

Primary Examiner—William A. Cuchlinski, Jr.
Assistant Examiner—Daniel DePumpo
Attorney, Agent, or Firm—Lawrence J. Shurupoff

[57] ABSTRACT

A unitized seal includes a first seal casing having a plastically deformable radially-extending unitizing flange and a second seal casing having at least one axially extending projection. The projection has an engagement surface which confronts the unitizing flange for engagement therewith. Upon installation of the seal, the projection axially deforms the unitizing flange in a localized area about the projection. Upon initial rotation of the seal the projection further axially deforms the remainder of the unitizing flange within one rotation. This arrangement minimizes the production of metal chips and/or abraded elastomeric particles during seal break-in and further minimizes resistance to seal rotation during break-in.

5 Claims, 1 Drawing Sheet

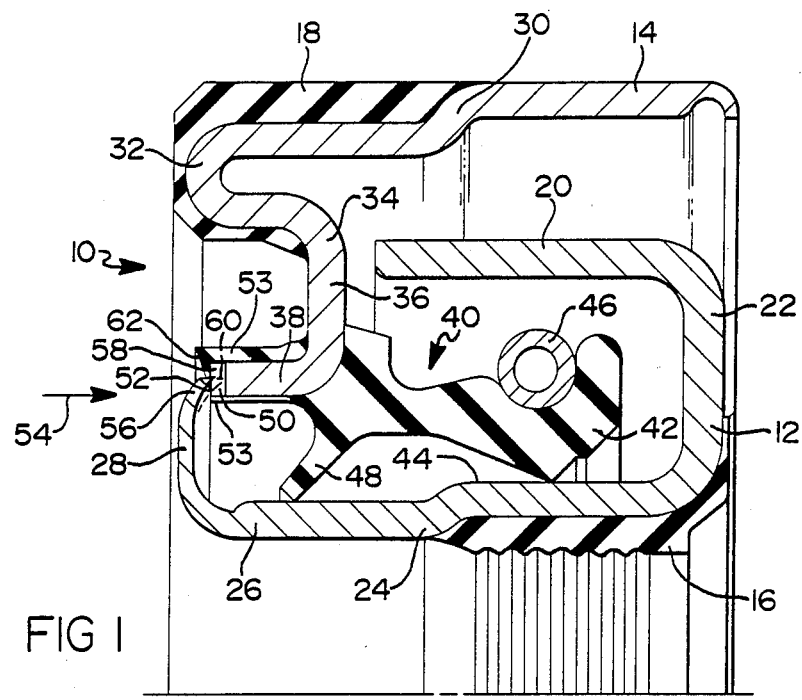
FIG 1
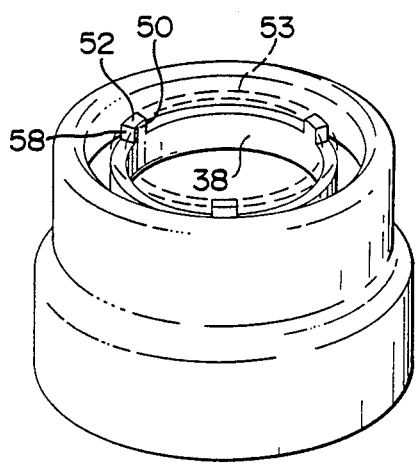
FIG 2
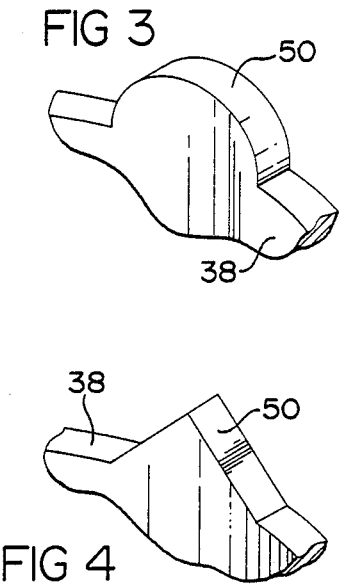
FIG 3
FIG 4

LOW FRICTION RADIAL LIP SEAL WITH DEFORMABLE SEAL CASING

BACKGROUND OF THE INVENTION

1. Technical Field

The present invention relates to radial lip seals and more particularly relates to seals which seal fluids between two relatively rotatable machine elements.

2. Brief Description of the Background Art

Radial lip oil seals are used in numerous rotating machine applications including wheels hubs, shaft journals and antifriction bearings. A particular form of a radial lip oil seal known as a unitized oil seal is preferred in certain applications because it protects the seal lips and minimizes the need for finishing the surfaces sealed by the unitized seal. A typical unitized radial lip seal includes relatively rotatable inner and outer metal elements or casings upon which elastomeric seal lips may be formed.

Unitized seals are often installed as a unit within a bore in a wheel hub. The wheel hub is then mounted over an axle around which the seal lip forms an annular sealing barrier. This mounting assembly generally involves some relative axial shifting of the inner and outer unitized seal elements. As the seal elements are axially shifted during installation, a significant axial load may be applied to the seal and may result in metal-to-metal, metal-to-rubber, and/or rubber-to-rubber contact between the inner and outer elements.

The large axial loads generated between the inner and outer seal elements during installation can bring about the formation of metal chips as the unitized seal is initially rotated and "broken-in." These metal chips can migrate beneath the seal lips causing abrasions and cuts in the lips and eventual seal failure. Such metal-to-metal contact can thereby reduce seal life and cause an increase in torque required to rotate the seal as the inner and outer metal elements rub against one another with significant friction.

In order to prevent metal-to-metal contact, prior unitized seals have used axially-extending elastomeric bumpers or nibs for axially spacing the inner seal element from the outer seal element. However, upon mounting the unitized seal within a housing bore and over a shaft, the axially-directed mounting forces axially compress the bumpers and nibs between the inner and outer sealing elements. During the initial break-in period of the unitized seal, the nibs or bumpers on one seal element must be worn away to eventually provide clearance or minimal contact between the bumpers and a locating surface on the other seal element.

During the break-in period, the rubber nibs or bumpers generate significant resistance to rotation between the inner and outer sealing elements. This resistance must be overcome by increasing the torque applied between the sealing elements. Clearly, this increased resistance is undesirable from an efficiency viewpoint as energy is required to overcome the friction generated by the abrasion of the bumpers and nibs. Moreover, the heat generated by the friction can adversely affect the seal lip materials and the abraded rubber can cause at least temporary seal leakage as the abraded rubber particles work their way under the seal lips.

Because the nibs are initially compressed during installation, they subsequently expand axially during break-in thereby prolonging the time during which start-up torque must be increased to generate relative rotation between the shaft and bore being sealed. That is, as the nibs are worn away, they still maintain contact with the other seal element as they axially expand to relative their compression. This prolongs the break-in period.

A typical example of a continuous unitized oil seal design is shown in U.S. Pat. No. 3,510,138 to Bowen which discloses the concept of providing a hard rubber surface on a unitized oil seal to minimize squealing of new seals when a seal case binds against an elastomeric portion of an oil seal. The hard rubber washer is bonded to the elastomeric body of the seal. If the seal of Bowen is assembled with excessive axial loading, the hard rubber washer will compress the elastomeric portion and result in increased torque being required to rotate the seal. Since the hard rubber washer is bonded to an elastomeric member, assembly of the seal is fairly complex and requires a difficult molding step.

Accordingly, a need exists for a unitized seal which reduces or eliminates the formation of abraded metal and/or rubber particles during break-in. A further need exists for a unitized oil seal which minimizes its break-in period and which significantly reduces initial or "start-up" torque requirements for initially rotating the newly installed seal. Yet another need exists for a unitized oil seal which, after break-in, generates minimal resistance to rotation.

SUMMARY OF THE INVENTION

The present invention has been developed to fulfill the needs noted above and therefore has as a primary object the provision of a unitized shaft seal which reduces or eliminates the formation of rubber and/or metal chips during its break-in period.

Another object is to provide a unitized shaft seal which reduces or minimizes its break-in period.

Yet another object is to provide a unitized shaft seal which requires less torque to break-in and operate than prior unitized seals.

Still another object of the invention is to provide a unitized shaft seal which forms an additional sealing barrier during seal installation.

These objects are met by the unitized seal constructed in accordance with the present invention wherein a thin-sectioned, easily-deformed unitizing flange provided on one of the seal casings is designed to partially deform during installation and to further deform during initial seal operation. As the unitizing flange is deformed, it may effect a slicing action into a confronting annular elastomeric surface so as to avoid abrading the elastomer and so as to form an additional sealing barrier therewith.

A major feature of the invention is the formation of one or more axially-extending projections on either one of the inner or outer metal seal casings. The projections are designed to engage the tip of the unitizing flange during seal installation and to provide a rigid surface against which the utilizing flange may transmit axial installation forces. As the seal is installed, the unitizing flange axially deforms a small amount in the localized area adjacent the axial projections. At the same time, the unitizing flange transfers the installation force to the axial projections and to an annulus of elastomeric material molded about and between the axial projections.

When the newly installed seal is initially rotated, the undeformed remainder of the unitizing flange is circumferentially deformed or curled back during its first rotation as the axial projection or projections plow back the non-deformed portions of the unitizing flange. Once a fully revolution of the seal is complete, little if any axial load remains between the unitizing flange and the projections so that resistance to rotation is minimal. Moreover, because the unitizing flange is easily deformed, it does not maintain any significant load against the projections and therefore does not generate metal chips.

If an additional sealing barrier is desired, the radially extending end face of each axial projection may be covered with a thin layer of elastomer which may be bonded to the seal casing as an extension of the annulus of elastomeric material provided between the axial projections. During installation, the unitizing flange shears through the elastomer and abuts each axial projection while axially compressing and/or shearing the remaining circumferential portions of the annulus of elastomer. In this manner, a continuous 360° sealing barrier may be formed during installation and during the first rotation of the seal as the tip of the unitizing flange becomes embedded within the elastomer. Because the elastomer is sheared or sliced and not abraded, little if any abraded particles are formed.

BRIEF DESCRIPTION OF THE DRAWINGS

Various other objects, features and attendent advantages of the present invention will be more fully appreciated from the following detailed description when considered in connection with the accompanying drawings, in which the same reference numbers designate the same or corresponding parts throughout.

FIG. 1 is an axial cross sectional view taken through a unitized oil bath seal constructed in accordance with the present invention.

FIG. 2 is a perspective view of one embodiment of the outer seal casing of FIG. 1, with all elastomeric material removed for clarity; and FIGS. 3 and 4 are fragmental perspective view of alternate embodiments of the axial projections.

DETAILED DESCRIPTION OF THE PREFERRED EMBODIMENTS

The present invention will now be described in conjunction with the drawings, beginning with FIG. 1, which shows a unitized seal 10 in a post-installation position, prior to its first rotation. Seal 10 includes a first or inner seal casing 12 and a second or outer seal casing 14, each formed of a plastically deformable material such as metal. Inner casing 12 is typically installed over a shaft while outer casing 14 is typically installed within a bore formed in a housing surrounding the shaft.

The inner casing 12 may include a molded inner ring 16 of elastomeric material for forming a fluid tight seal with a shaft while the outer casing 14 may include a molded outer ring 18 of elastomeric material for forming a fluid tight seal with a bore. As further seen in FIG. 1, inner casing 12 is formed with an outer axially extending portion 20 which leads to a radial portion 22 which extends radially inwardly into an inner radially stepped axial portion 24. At the end 26 of inner axial portion 24, opposite radial portion 22, a radial unitizing flange 28 is formed. The details of flange 28 will be discussed below.

The outer casing 14 is formed with an outer radially stepped axial portion 30 which forms a radial inward reverse bend 32 which leads to a second radial inward reverse bend 34 thereby defining a generally S-shaped casing section at one end of axial portion 30. Bend 34 includes a radial portion 36 and an axial flange port 38. An elastomeric seal body 40 is bonded or molded to the outer seal casing so as to cover and encapsulate flange 38.

Seal body 40 may be formed with a primary seal lip 42 which rotates and slides against the inner surface 44 of inner axial portion 24 of the inner casing 12. Primary seal lip 42 may be biased against surface 44 with a garter spring 46 in a conventional fashion. If desired, a secondary seal lip 48 may be formed on seal body 40 for excluding dirt and debris from access to primary seal lip 42. Generally, the primary seal lip 42 is exposed to the fluid being sealed while the secondary seal lip 48 is positioned between the primary lip and the ambient environment.

The invention centers around the interaction between axial flange 38 on the outer casing 14 and unitizing flange 28 on the inner casing 12. More particularly, as seen in FIG. 2, flange 38 is formed with at least one axial projection 50. Although three evenly circumferentially spaced projections are shown in FIG. 2, any suitable number may be provided. Each projection is formed with a radially extending abutment or engagement surface 52 for engaging the unitizing flange 28.

It should be noted that the elastomeric seal body 40 and the outer ring 18 have been removed from the outer casing 14 as depicted in FIG. 2 for the sake of clarity. However, phantom lines are provided to depict the location of an annulus 53 of elastomeric material, the details of which will be discussed below.

Unitizing flange 28 is formed with a thin, relatively easily deformable cross section which is typically thinner than the cross section of the inner axial portion 26 of the inner casing 12. The thickness of unitizing flange 28 will vary depending upon its length, material characteristics and the expected axial force required for installation of the seal 10. That is, unitizing flange 28 is designed to transfer, in the direction of arrow 54, sufficient axial installation force to the engagement surfaces 52 and to annulus 53 which surrounds and encapsulates the axial projections 50 in order to overcome the frictional resistance experienced during installation.

As seal 10 is installed, the tip 56 of unitizing flange 28 is axially plastically deformed around the sides 58 of each axial projection 50 while the remaining undeformed portions 60 (shown in phantom in FIG. 1) of tip 56 slightly compress and/or bite into the annulus 53 of elastomeric material located between the axial projections 50. In those cases where an additional sealing barrier is desired, each abutment surface 52 may be partially or completely covered by the annulus 53 of elastomeric material which circumferentially fills the gaps defined between the axial projections 50. As seen in FIG. 1, a radially inwardly converging 360° lip 62 of elastomeric material is bonded or molded over each engagement surface 52. During installation, tip 56 of unitizing flange 28 pinches and shears through those portions of lip 62 which cover the engagement surfaces 52.

Upon initial rotation of the seal 10, tip 56 further shears through the remainder of annulus 53 in the manner of a rotating knife blade. At the same time, the undeformed portions 60 of tip 56 are axially curled back or plowed out of interference with the ends of axial projections 50. The amount of deformation of tip 56 extends from the position shown in phantom in FIG. 1 to the axial position shown in abutment with engagement surface 52 in FIG. 1.

It can be appreciated that after a single rotation, or less, tip 56 of unitizing flange 28 will form a 360° barrier to the ambient as the flange cuts a groove and embeds itself within annulus 53. Moreover, once tip 56 has been curled back after one or less rotation, it will generate little resistance to rotation due to its thin section and inability to maintain any significant axial load through elastic deformation. That is, tip 56 is designed to be easily plastically deformed so that residual elastic deformation loads are minimized.

While generally rectangular sectioned projections 50 are shown in FIG. 1, they may take any suitable form such as the arcuate or triangular forms shown in FIGS. 3 and 4.

Obviously numerous modifications and variations of the present invention are possible in light of the above teachings. It is therefore to be understood that within the scope of the appended claims, the invention may be practiced otherwise than as specifically described herein. For example, flange 28 may be formed on the outer casing 14 and the axial projections may be formed on the inner casing 12.

What is claimed is:

1. A unitized seal, comprising:
   a first seal casing comprising a plastically deformable radially extending unitizing flange; and
   a second seal casing comprising at least one axially extending projection, said projection having an engagement surface confronting said unitizing flange for engagement therewith, such that upon installation of said seal, said projection axially deforms said unitizing flange and such that upon initial rotation of said seal, said projection further axially deforms said unitizing flange.

2. The seal of claim 1, further comprising an annulus of elastomeric material provided on said second seal casing and confronting said unitizing flange, such that upon said installation, said unitizing flange abuts said annulus to form a barrier therewith.

3. The seal of claim 2, wherein said annulus covers said engagement surface with an elastomeric lip portion such that upon said installation, said unitizing flange embeds itself within said elastomeric lip.

4. The seal of claim 3, wherein said unitizing flange forms a 360° groove within said annulus upon initial rotation of said seal.

5. A method of installing a unitized seal having a first casing, a second casing, a unitizing flange provided on said first casing and an engagement surface provided on said second casing, wherein said method comprises applying an axially directed force to said first casing such that said unitizing flange plastically deforms against said engagement surface such that resistance to rotation between said first and second casings is reduced after one rotation of said seal.

* * * * *